(12) United States Patent
Lim

(10) Patent No.: US 9,971,816 B2
(45) Date of Patent: May 15, 2018

(54) METHOD AND APPARATUS FOR APPLICATION MANAGEMENT

(71) Applicant: Samsung Electronics Co., Ltd., Gyeonggi-do (KR)

(72) Inventor: Kyung-Soo Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 677 days.

(21) Appl. No.: 14/283,773

(22) Filed: May 21, 2014

(65) Prior Publication Data

US 2014/0351206 A1    Nov. 27, 2014

(30) Foreign Application Priority Data

May 21, 2013 (KR) ......................... 10-2013-0057337

(51) Int. Cl.
*G06F 17/30* (2006.01)
*G06F 9/445* (2018.01)

(52) U.S. Cl.
CPC ........ *G06F 17/30554* (2013.01); *G06F 9/445* (2013.01); *G06F 9/44526* (2013.01)

(58) Field of Classification Search
CPC ............................................... G06F 17/30554
USPC ....................................................... 707/609
See application file for complete search history.

(56) References Cited

U.S. PATENT DOCUMENTS

| 6,138,233 | A  | 10/2000 | Lim |
| 2005/0278544 | A1 | 12/2005 | Baxter |
| 2009/0305732 | A1 | 12/2009 | Marcellino et al. |
| 2012/0023185 | A1 | 1/2012 | Holden et al. |
| 2012/0081207 | A1 | 4/2012 | Toprani et al. |
| 2014/0047458 | A1 | 2/2014 | Li et al. |

FOREIGN PATENT DOCUMENTS

| EP | 1 465 064 | 10/2004 |
| EP | 2 568 378 | 3/2013 |
| WO | WO 2012/109781 | 8/2012 |

OTHER PUBLICATIONS

Anonymous: "AutoPlay—Wikipedia, the free Encyclopedia", XP055250568, Oct. 27, 2009, 16 pages.
European Search Report dated May 2, 2016 issued in counterpart application No. 14169266.5-1954, 9 pages.
European Search Report dated Oct. 13, 2016 issued in counterpart application No. 14169266.5-1954, 4 pages.

*Primary Examiner* — Joshua Bullock
(74) *Attorney, Agent, or Firm* — The Farrell Law Firm, P.C.

(57) ABSTRACT

An apparatus and method for managing an application in a digital device are provided. The method includes receiving Appcessory identification information from an accessory device if the accessory device is connected to the digital device; searching, based on the Appcessory identification information, for at least one application having a function of controlling the accessory device from among at least one application installed in the digital device; and displaying application information associated with the at least one searched application according to a result of the search.

28 Claims, 10 Drawing Sheets

METHOD AND APPARATUS FOR APPLICATION MANAGEMENT

PRIORITY

This application claims priority under 35 U.S.C. §119(a) to a Korean patent application filed on May 21, 2013 in the Korean Intellectual Property Office and assigned Serial No. 10-2013-0057337, the entire content of which is incorporated herein by reference.

BACKGROUND OF THE INVENTION

1. Field of the Invention

The present invention relates generally to a digital device, and more particularly to a method and apparatus for managing applications stored in a digital device.

2. Description of the Related Art

Lately, portable digital devices have been providing increasingly-varied types of services and additional functions. In order to increase an effective value of digital devices and satisfy users' various demands, various types of applications (i.e., application software programs) executable in a digital device are being developed.

Accordingly, many applications can be stored in digital devices, such as smart phones and tablet Personal Computers (PCs). Also, shortcut icons for executing the respective applications are displayed on a touch screen of the digital device. Accordingly, a user can execute a desired application on the digital device by touching one of the shortcut icons displayed on the touch screen. Other than the shortcut icons, various types of visual objects, for example, widgets, pictures, and documents may be displayed on a touch screen of a digital device.

With expansion of additional functions for digital devices and development of various applications, digital devices provide various services by connecting to external devices. For example, if a digital device is connected to an external speaker, the digital device can output audio through the external speaker. In order for the digital device to output audio through the external speaker, the digital device executes an audio application, plays an audio file, and transfers audio signals generated by playing the audio file to the external speaker. A device that connects to a digital device and provides a service under the control of the digital device, such as an external speaker, for example, is called an accessory device.

A plurality of applications stored in a digital device may be classified into accessory applications capable of providing services through accessory devices connected to the digital device, and non-accessory applications incapable of providing services through accessory devices.

However, there is no method of enabling a user to determine, before executing an application, whether the application is an accessory application or a non-accessory application.

Accessory applications are also classified according to types of accessories associated with the application. However, even when using an accessory application, a user cannot precisely recognize what types of accessories the application is associated with before executing the application. Accordingly, after connecting a certain accessory device to a digital device, a user is still required to check all applications stored in the digital device, in order to find an application associated with the connected accessory device.

SUMMARY OF THE INVENTION

Aspects of the present invention are provided to address at least the above-mentioned problems and/or disadvantages and to provide at least the advantages described below.

Accordingly, an aspect of the present invention provides a method and apparatus for enabling a user to easily distinguish a plurality of applications stored in a digital device.

Another aspect of the present invention provides a method and apparatus for enabling a user to distinguish an application capable of controlling an accessory device among a plurality of applications stored in a digital device.

Another aspect of the present invention provides a method and apparatus for automatically providing a user with information about an application associated with an accessory connected to a digital device.

In accordance with an aspect of the present invention, a method for managing an application in a digital device is provided. The method includes receiving Appcessory identification information from an accessory device if the accessory device is connected to the digital device; searching, based on the Appcessory identification information, for at least one application having a function of controlling the accessory device from among at least one application installed in the digital device; and displaying application information associated with the at least one searched application according to a result of the search.

In accordance with another aspect of the present invention, an application management apparatus for a digital device is provided. The application management apparatus includes a display panel displaying various data under a control of a controller; and the controller acquiring Appcessory identification information from an accessory device if the accessory device is connected to the digital device, searching for, based on the Appcessory identification information, at least one application having a function of controlling the accessory device from among at least one application installed in the digital device, and causing application information associated with the at least one searched application to be displayed on the display panel according to a result of the search.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
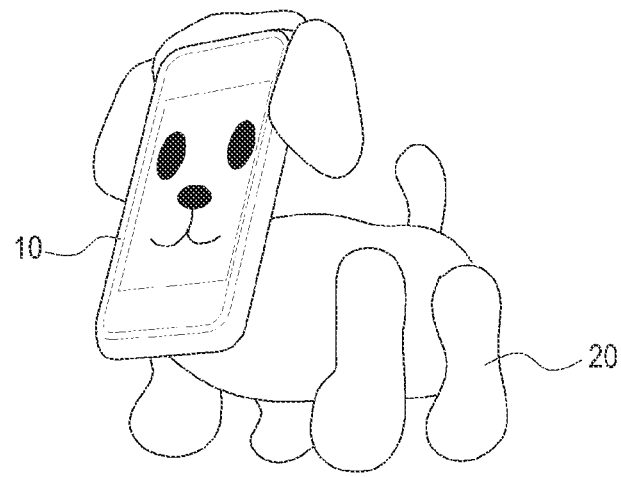
FIG. 1 is a diagram illustrating a digital device connected to an accessory device, according to an embodiment of the present invention.

The following description with reference to the accompanying drawings is provided to assist in a comprehensive understanding of embodiments of the invention as defined by the claims and their equivalents. The following description includes various specific details to assist in this understanding, but these specific details are to be regarded as mere examples. Accordingly, various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but are merely used to enable a clear and consistent understanding of the invention. Accordingly, the following description of embodiments of the present invention is provided for illustration purposes only and does not limit scope of the present invention as defined by the appended claims and their equivalents.

Herein, singular forms "a," "an," and "the" include plural referents unless the context clearly dictates otherwise. Thus, for example, reference to "a component surface" includes reference to at least one such surface.

Throughout the drawings, like reference numerals will be understood to refer to like parts, components, and structures.

In order to increase an effective value of a digital device and satisfy a user's various demands, various kinds of application software programs (hereinafter, referred to as applications) executable in a digital device are being developed.

Accordingly, many applications may be stored in a digital device, such as a smart phone or a tablet PC. Also, objects (e.g., shortcut icons) for executing the respective applications are displayed on the touch screen of the digital device. Accordingly, a user can execute a desired application on the digital device by touching one of the shortcut icons displayed on the touch screen.

With expansion of additional functions for digital devices and development of various applications, digital devices are providing various services through external devices wiredly or wirelessly connected thereto. In other words, if an application required for controlling an external device has been installed in a digital device, the digital device may execute the corresponding application after the external device is wiredly or wirelessly connected to the digital device, and control the operation of the external device.

For example, a digital device may execute an audio play application after connecting to an external speaker, and output audio through the external speaker. According to another example, a digital device in which a remotely-controlled car application has been installed may control the corresponding remotely-controlled car remotely using the remotely-controlled car application.

In the following description, an external device that is connected to a digital device and operates under a control of the digital device is referred to as an accessory device, and an application for controlling an accessory device that has a function for controlling the accessory device is referred to as an Appcessory application. In other words, an Appcessory application is an application software program that is stored and installed in a digital device and can control at least one accessory device. Appcessory is a portmanteau of "Application" and "Accessory". An Appcessory service is a service for enabling a digital device to acquire a function for controlling an accessory device associated with an application for accessory installed in the digital device if the application for accessory has been installed in the digital device, and to control the driving and operation of the accessory device.

FIG. 1 illustrates a digital device connected to an accessory device, according to an embodiment of the present invention. FIG. 1 illustrates an example in which a smart phone 10 has been installed in a head of a robot dog 20 to control operation of the robot dog 20. A user may download a robot dog application, and store and install the application in the smart phone 10. If the robot dog application is executed after the smart phone 10 is mounted on the robot dog 20, a dog's face is displayed on the touch screen of the smart phone 10. Thereafter, if a voice command is received from the user, the smart phone 10 controls the robot dog 20 according to the voice command to cause the robot dog 20 to walk or sit down. The robot dog application analyzes the voice command from the user, and transfers a control signal corresponding to the voice command to the robot dog 20. In the example of FIG. 1, the robot dog application is an Appcessory application, and the robot dog 20 is an accessory device.

As such, an Appcessory application and a digital device function as a brain of an accessory device, and the accessory device functions as hardware of the Appcessory application and the digital device.

The Appcessory application is distinguishable from other applications that are not associated with accessory devices in that the Appcessory application controls an accessory device. However, application icons displayed on a home screen of a general digital device include no information indicating whether the application icons correspond to applications associated with accessory devices. Accordingly, a user cannot easily recognize what kinds of applications the application icons displayed on the home screen correspond to.

In order to overcome the problem, according to an embodiment of the present invention, when an accessory device is connected to a digital device, the digital device searches for an Appcessory application associated with the accessory device from among applications installed in the digital device, and displays information about the searched Appcessory application.

An example according to an embodiment of the present invention for displaying the information about the searched Appcessory application is described as follows. If no accessory device is connected to a digital device, icons of all Appcessory applications installed in the digital device are displayed in a deactivated status. Then, if an accessory device is connected to the digital device, the digital device searches for an Appcessory application associated with the accessory device, and an icon of the searched Appcessory application is displayed in an activated status. At this time, the icon having the activated status and the icons in the deactivated status are displayed in a manner that is distinguished from icons of other applications that are not Appcessory applications.

Another example according to an embodiment of the present invention for displaying the information about the searched Appcessory application is described as follows. If an accessory device is connected to a digital device, the digital device searches for an Appcessory application associated with the accessory device. Then, the digital device collects updated information of the searched Appcessory application and non-installation application information about Appcessory applications associated with the accessory device but not installed in the digital device, from an application providing server. The digital device also collects status information of the accessory device from the accessory device. Then, the digital device provides the user with information about the searched Appcessory application, the update information of the Appcessory application, the non-installation application information, and the status information of the accessory device. The digital device also updates the existing Appcessory application, downloads and installs a new Appcessory application, or updates firmware of the accessory device, according to the user's input.

Also, in another example according to an embodiment of the present invention, if an interrupt is generated while an Appcessory application is executed, the digital device may ignore the interrupt, provide a least a portion of interrupt information to a user and process the interrupt information, or notify a user of generation of the interrupt using a predetermined alternative method, according to a predetermined interrupt mode.

Figure 2:
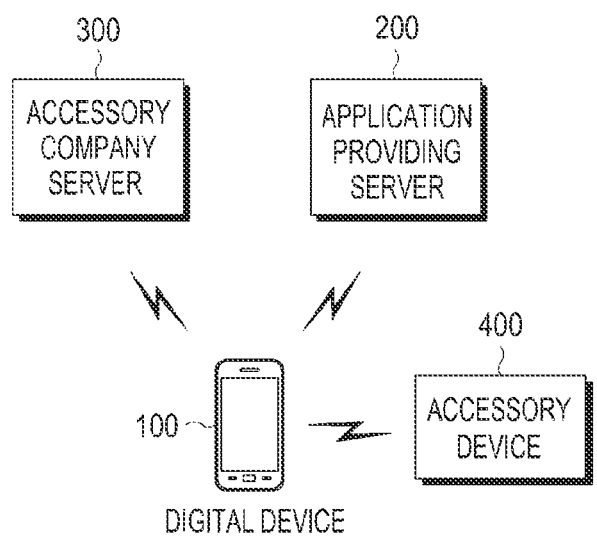
FIG. 2 is a block diagram illustrating a configuration of a service system according to an embodiment of the present invention.

FIG. 2 is a block diagram illustrating a configuration of a service system according to an embodiment of the present invention.

Referring to FIG. 2, the service system includes a digital device 100, an accessory device 400, and an application providing server 200 and an accessory company server 300.

The application providing server 200 transfers at least one application to the digital device 100 according to a request from the digital device 100 so that the application is installed in the digital device 100.

Figure 3:
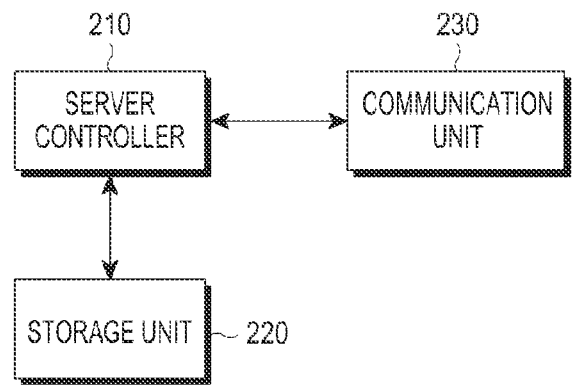
FIG. 3 is a block diagram illustrating a configuration of an application providing server according to an embodiment of the present invention.

An example of the application providing server 200 is illustrated in FIG. 3. FIG. 3 is a block diagram illustrating a configuration of the application providing server 200 according to an embodiment of the present invention.

Referring to FIG. 3, the application providing server 200 includes a server controller 210, a storage unit 220, and a communication unit 230.

The communication unit 230 communicates with the digital device 100 to transmit/receive data to/from the digital device 100 under the control of the server controller 210.

The storage unit 220 stores signals/data to be transmitted through or signals/data received through the communication unit 230, under the control of the server controller 210. The storage unit 220 stores a control program for controlling the application providing server 200. The storage unit 220 also stores a plurality of applications and update information about the individual applications.

In an example according to an embodiment of the present invention, applications are classified into Appcessory applications and general applications. The Appcessory applications are used to control accessory devices connected to a digital device. The general applications do not have any functions for controlling accessory devices.

In another example according to an embodiment of the present invention, an Appcessory application includes at least one piece of Appcessory identification information. Appcessory identification information is information representing a correlation between an accessory and the corresponding Appcessory application. Accordingly, Appcessory identification information is information used for identifying an accessory device controllable by an Appcessory application or for identifying an Appcessory application having a function of controlling an accessory device. In another example according to an embodiment of the present invention, Appcessory identification information includes identification information of an accessory device. In addition, the Appcessory identification information includes identification information of an accessory company (or identification information of an accessory manufacturer). In another example according to an embodiment the present invention, the Appcessory identification information includes at least one piece of information of device identification information of an accessory device and company identification information of the accessory device.

The server controller 210 controls overall operation of the application providing server 200. If a download request for a specific application is received from the digital device 100 through the communication unit 230, the server controller 210 transmits the specific application to the digital device 100. If a request for information about whether a specific application has been updated is received from the digital device 100 through the communication unit 230, the server controller 210 transmits information indicating whether the specific application has been updated to the digital device 100. Also, if a request for update information of a specific application is received from the digital device 100 through the communication unit 230, the server controller 210 transmits update information of the specific application to the digital device 100 so that the specific application can be updated.

Meanwhile, if a request for information about an Appcessory application associated with a specific accessory device is received from the digital device 100 through the communication unit 230, the server controller 210 searches for the corresponding Appcessory application using Appcessory identification information included in the request, and transmits the search result to the digital device 100.

Figure 4:
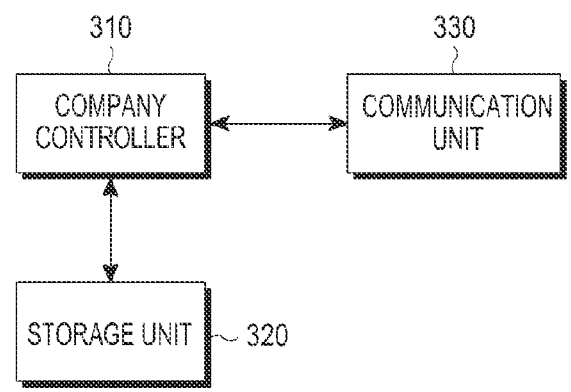
FIG. 4 is a block diagram illustrating a configuration of an accessory company server according to an embodiment of the present invention.

Referring again to FIG. 2, the accessory company server 300 manages firmware of the accessory device. An example of the accessory company server 300 is illustrated in FIG. 4. FIG. 4 is a block diagram illustrating a configuration of the accessory company server 300 according to an embodiment of the present invention. Referring to FIG. 4, the accessory company server 300 includes a company controller 310, a storage unit 320, and a communication unit 330.

The communication unit 330 communicates with the digital device 100 to transmit/receive data to/from the digital device 100 under the control of the company controller 210.

The storage unit 320 stores signals/data to be transmitted through or signals/data received through the communication unit 330, under the control of the company controller 310. The storage unit 320 stores a control program for controlling the accessory company server 300. The storage unit 320 also stores firmware information about at least one accessory device.

The company controller 310 controls overall operation of the accessory company server 300. If a request for firmware version of a specific accessory device is received from the digital device 100 through the communication unit 330, the company controller 310 checks the corresponding firmware version, and transmits the result of the check to the digital device 100. Also, if a request for firmware information of a specific accessory device is received from the digital device 100 through the communication unit 330, the company controller 310 transmits the corresponding firmware information to the digital device 100. The firmware information is used for updating firmware of the corresponding accessory device.

Referring again to FIG. 2, the accessory device 400 is wiredly or wirelessly connected to the digital device 100, and operates under the control of the digital device 100. The accessory device 400 may be a speaker, a television (TV), a monitor, a remotely-controlled car, a remotely-controlled airplane, or medical equipment. An example of the accessory device 40 is illustrated in FIG. 5.

Figure 5:
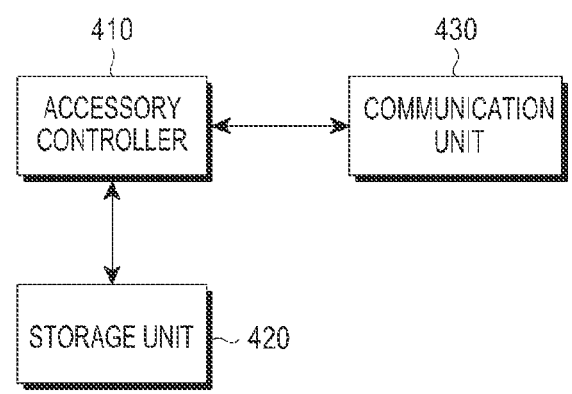
FIG. 5 is a block diagram illustrating a configuration of an accessory device according to an embodiment of the present invention.

FIG. 5 is a block diagram illustrating a configuration of the accessory device 400 according to an embodiment of the present invention.

Referring to FIG. 5, the accessory device 400 includes an accessory controller 410, a storage unit 420, and a communication unit 430.

The communication unit 430 transmits/receives data to/from the digital device 100 through wireless or wired communication with the digital device 100, under the control of the accessory controller 410. For example, the communication unit 430 performs communication based on at least one communication method of Wireless LAN (WLAN) communication supporting a WLAN standard Institute of Electrical and Electronics Engineers (IEEE) 802.11x, Bluetooth, and Infrared Data Association (IrDA).

The storage unit 420 stores signals/data to be transmitted through or signals/data received through the communication unit 430 under a control of the accessory controller 410. The storage unit 420 stores a control program for controlling the accessory device 400. Also, the storage unit 420 stores unique Appcessory identification information corresponding to the accessory device 400. The storage unit 420 also stores status information and firmware information of the accessory device 400. Herein, firmware refers to a software program for operating and driving the accessory device 400. The firmware information is information for updating the firmware. The status information may include, for example, a battery level of the accessory device 400, firmware version information, and address information for downloading the firmware information.

The accessory controller 410 controls overall operation of the accessory device 400 according to a control signal received from the digital device 100 through the communication unit 430. If a request to register accessory identification information is received from the digital device 100 through the communication unit 430, the accessory controller 410 transmits accessory identification information to the digital device 100. If a request to register status information is received from the digital device 100 through the communication unit 430, the accessory controller 410 transmits status information of the accessory device 400 to the digital device 100. Also, if firmware information is received from the digital device 100 through the communication unit 430, the accessory controller 410 updates firmware of the accessory device 400 based on the received firmware information, and if the firmware of the accessory device 400 has been completely updated, the accessory controller 410 notifies the digital device 100 of the fact that the firmware of the accessory device 400 has been completely updated. Accordingly, the firmware of the accessory device 400 is updated to the latest version.

Referring again to FIG. 2, if the digital device 100 is connected to the accessory device 400 in a wired or wireless manner, the digital device 100 executes an Appcessory application associated with the accessory device 400, and controls the accessory device 400. The digital device 100 also manages Appcessory applications installed therein. The digital device 100 may be a mobile communication terminal, a smart phone, a tablet PC, a personal computer, a portable game, or a portable multimedia player. An example of the digital device 100 is illustrated in FIG. 6.

Figure 6:
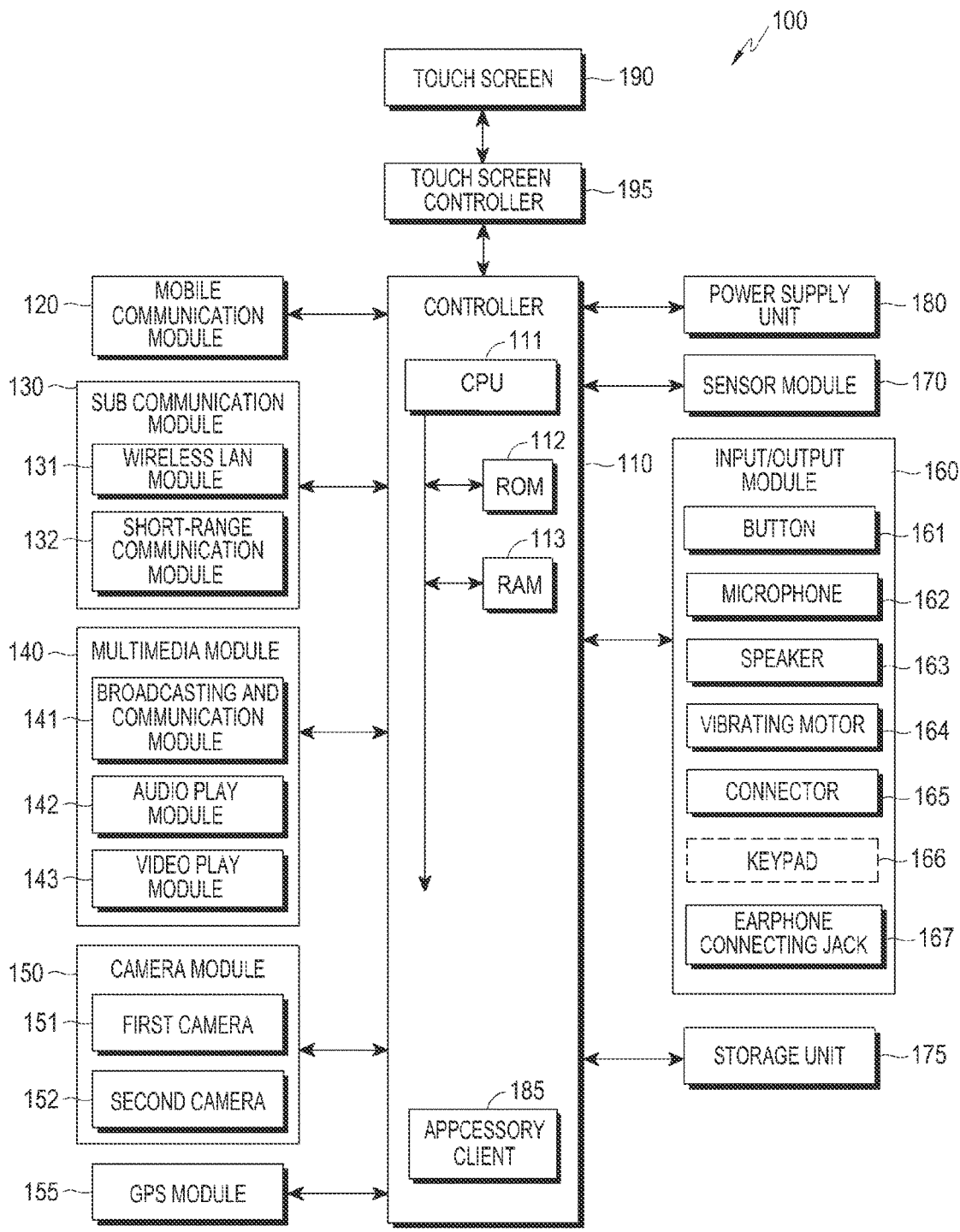
FIG. 6 is a block diagram illustrating a configuration of a digital device according to an embodiment of the present invention.

FIG. 6 is a block diagram illustrating a configuration of a digital device according to an embodiment of the present invention.

Referring to FIG. 6, the digital device 100 (hereinafter, referred to as a "device") may be connected to an external device (not shown) through a mobile communication module 120, a sub communication module 130, or a connector 165. The "external device" may be another device (not shown), such as a mobile phone, a smart phone, a tablet PC, or a server. Referring to FIG. 6, the device 100 includes a touch screen 190 and a touch screen controller 195. The device 100 also includes a controller 110, a multimedia module 140, a camera module 150, a Global Positioning System (GPS) module 155, an input/output module 160, a sensor module 170, a power supply unit 180, and a storage unit 175. The device 100 also includes at least one of the mobile communication module 120 and the sub communication module 130. The sub communication module 130 includes at least one of a WLAN module 131 and a short-range communication module 132, and the multimedia module 140 includes at least one of a broadcasting and communication module 141, an audio play module 142, and a video play module 143. The camera module 150 includes at least one of a first camera 151 and a second camera 152, and the input/output module 160 includes at least one of a plurality of buttons 161, a microphone 162, a speaker 163, a vibration motor 164, the connector 165, and a keypad 166.

The controller 110 includes a Central Processing Unit (CPU) 111, a Read Only Memory (ROM) 112 that stores control programs for controlling the device 100, and a Random Access Memory (RAM) 113 that stores signals/data received from an external device or tasks being executed by the device 100. The CPU 111 may be a single-core or a multi-core processor (e.g., a dual-core processor, a triple-core processor, a quad-core processor, or a penta-core processor, etc.). The CPU 111, the ROM 112, and the RAM 113 are connected to each other through internal buses.

The controller 110 controls the mobile communication module 120, the sub communication module 130, the multimedia module 140, the camera module 150, the GPS module 155, the input/output module 160, the sensor module 170, the power supply unit 180, the storage unit 175, the touch screen 190, and the touch screen controller 195.

The mobile communication module 120 enables the device 100 to connect to an external device through mobile communication using at least one antenna (not shown) under the control of the controller 110. The mobile communication module 120 transmits/receives radio signals for voice calls, video calls, Short Message Service (SMS), or Multimedia Message Service (MMS) with a device (not shown) such as a mobile phone, a smart phone, a tablet PC, or another device having a phone number input to the device 100, to/from the device 100.

The sub communication module 130 includes, as described above, at least one of the WLAN module 131 and the short-range communication module 132.

The WLAN module 131 connects to the Internet at a place in which a wireless Access Point (AP) is installed, under the control of the controller 110. The WLAN module 131 supports IEEE802.11x. The short-range communication module 132 performs wireless short-range communication between the device 100 and an imaging device (not shown) under the control of the controller 110. The short-range communication may include Bluetooth, InfraRed Data Association (IrDA), etc.

The device 100 includes at least one of the mobile communication module 120, the WLAN module 131, and the short-range communication module 132. For example, the device 100 may include a combination of the mobile communication module 120, the WLAN module 131, and the short-range communication module 132.

The multimedia module 140 includes, as described above, the broadcasting and communication module 141, the audio play module 142, or the video play module 143. The broadcasting and communication module 141 receives a broadcasting signal (for example, a TeleVision (TV) broadcasting signal, a radio broadcasting signal, or a data broadcasting signal) and additional broadcasting information (e.g., an Electric Program Guide (EPG) or an Electric Service Guide (ESG)) transmitted from a broadcasting station through a broadcasting and communication antenna (not shown), under the control of the controller 110. For example, the audio play module 142 may reproduce a digital audio file (e.g., a file having the filename extension of ".mp3", ".wma", ".ogg", or ".wav", for example) that is stored or received under the control of the controller 110. The video play module 143 reproduces a digital video file (for example, a file having the filename extension of ".mpeg", ".mpg" ".mp4", ".avi", ".mov", or ".mkv", for example) or a digital audio file that is stored or received under the control of the controller 110.

However, the multimedia module 140 may include only the audio play module 142 and the video play module 143. The audio play module 142 and the video play module 143 of the multimedia module 140 may be included in the controller 100.

The camera module 150 includes at least one of the first camera 151 and the second camera 152 for photographing still images or moving images under the control of the controller 110. The first camera 151 or the second camera 152 may include an additional light source (not shown), such as a flash, for example, for providing an amount of light required for photographing. The first camera 151 may be disposed in the front part of the device 100, and the second camera 152 may be disposed in the rear part of the device 100.

The GPS module 155 receives radio waves from a plurality of earth-orbiting GPS satellites (not shown), and calculates a position of the device 100 using a time of arrival taken for the radio waves from the GPS satellites to arrive at the device 100.

The input/output module 160 includes, as described above, at least one of the plurality of buttons 161, the microphone 162, the speaker 163, the vibration motor 164, the connector 165, and the keypad 166.

The buttons 161 are provided in the front, side, and/or rear part of the housing of the device 100. The buttons 161 may include at least one of a power/lock button (not shown), volume buttons (not shown), a menu button (not shown), a home button (not shown), a back button (not shown), a search button (not shown).

The microphone 162 receives voice or sound under the control of the controller 110 to generate an electrical signal.

The speaker 163 receives various signals (e.g., a radio signal, a broadcasting signal, a digital audio file, a digital video file, or a photo file) from the mobile communication module 120, the sub communication module 130, the multimedia module 140, or the camera module 150, and output sound corresponding to the various signals to the outside of the device 100, under the control of the controller 110. Also, the speaker 163 outputs sound (e.g., button sounds or currency connection sounds) corresponding to a function that is performed by the device 100. The speaker 163 is provided as at least one unit at an appropriate location (or locations) on the housing of the device 100.

The vibration motor 164 converts an electrical signal into mechanical vibration under the control of the controller 110. For example, when the device 100 is in a vibration mode, the vibration motor 164 operates if a voice call is received from another device (not shown). The vibration motor 164 is provided as at least one unit in the housing of the device 100. The vibration motor 164 operates in response to a user's touch operation (e.g., touching and/or dragging) with respect to the touch screen 190.

The connector 165 is used as an interface for connecting the device 100 to an external device (not shown) or a power source (not shown). Data stored in the storage unit 175 of the device 100 is transmitted to an external device (not shown) through a wired cable connected to the connector 165 under the control of the controller 110, or data of an external device (not shown) may be received through the wired cable connected to the connector 165, and stored in the storage unit 175 under the control of the controller 110. Also, the device 100 may receives power or charges a battery from a power source (not shown) through the wired cable connected to the connector 165.

The keypad 166 receives key input from a user in order to control the device 100. The keypad 166 includes a physical keypad (not shown) that is provided on the device 100, or a virtual keypad (not shown) that is displayed on the touch screen 190. The device 100 may include no physical keypad according to a structure of the device 100.

The sensor module 170 includes at least one sensor for detecting a status of the device 100. For example, the sensor module 170 may include a proximity sensor (not shown) for determining whether a user approaches the device 100 or whether a finger or a pen 200 approaches the touch screen 190, an ambient light sensor (not shown) for measuring an amount of ambient light around the device 100, or an acceleration sensor (not shown) for detecting motion (rotation, acceleration, or vibration) of the device 100. At least one sensor among the above-mentioned sensors may detect a state of the device 100, the state including a direction and a tilting angle of the device 100, generate a signal corresponding to the detected state, and transfer the signal to the controller 110. The sensor module 170 may further include other sensors than the above-mentioned sensors according to the performance of the device 100.

The power supply unit 180 supplies power to at least one battery (not shown) installed in the housing of the device 100, under the control of the controller 110. The batteries (not shown) supply power to the device 100. Also, the power supply unit 180 supplies power received from an external power source (not shown) through the wired cable connected to the connector 165 to the device 100.

The storage unit 175 stores signals or data that is input/output according to operations of the mobile communication module 120, the sub communication module 130, the multimedia module 140, the camera module 150, the GPS module 155, the input/output module 160, the sensor module 170, the touch screen 190, and the Appcessory client 185, under the control of the controller 110. The storage unit 175 stores control programs and applications for controlling the device 100 or the controller 110, and also stores at least one application.

In this description, the term a "storage unit" includes the storage unit 175, the ROM 112 or RAM 113 included in the controller 110, and a memory card (not shown, for example, a Secure Digital (SD) card or a memory stick) installed in the device 100. The ROM 112 and ROM 113 may be included in the storage unit 175, instead of the controller 110. The storage unit 175 may include a non-volatile memory, a volatile memory, a Hard Disk Drive (HDD), or a Solid State Drive (SSD).

The touch screen 190 provides a user with User Interfaces (UIs) corresponding to various services (for example, a call, data transmission, broadcasting, photography, etc.). The touch screen 190 includes a touch panel and a display panel, wherein the touch panel is mounted on the display panel.

The touch screen controller 195 drives the display panel under the control of the controller 110, and displays various data received from the controller 110 on the display panel. The display panel may be a Liquid Crystal Display (LCD) or an Active-Matrix Organic Light-Emitting Diode (AMO-LED), and display various images according to various operation states of the device 100, execution of an application, a service, and the like.

The touch panel is capable of sensing at least one touch operation by various instruments, such as a user's body part (e.g., a finger or a thumb) or a pointing device (e.g., a stylus pen). Also, the touch panel is able to sense a touch-and-drag operation, in which case, the touch panel may transfer an analog signal corresponding to a touch trajectory according to the touch-and-drag operation to the touch screen controller 195.

In this description, a touch operation is not limited to a contact between the touch screen 190 and a user's body part or a pointing device, and includes a contactless touch operation. A distance detectable by the touch screen 190 may vary depending on the performance or structure of the device 100. The touch screen 190 may be a resistive type, a capacitive type, an infrared type, an Electro-Magnetic Resonance (EMR) type, an acoustic wave type, or a combination of two or more of the above-mentioned types.

The digital device 100 has a configuration for managing Appcessory applications. The logical configuration of the digital device 10, according to an embodiment of the present invention, includes an Appcessory framework (not shown), Operating System (OS) (not shown), and at least one Appcessory application (not shown). Referring again to FIG. 6, the controller 110 may include the Appcessory client 185 as described above. The controller 110 or the Appcessory client 185 manages Appcessory applications stored and installed in the device 100. The Appcessory client 185 manages connections and operations between the Appcessory applications and accessory devices, and manages system resources for the connections and operations between the Appcessory applications and the accessory devices. Accordingly, the Appcessory client 185 manages wired or wireless connections between the digital device 100 and the accessory device 400 (see FIG. 2), and manages sessions and protocols between the digital device 100 and the accessory device 400. More specifically, the Appcessory client 185 manages execution of an Appcessory application, data processing of the digital device 100 according to the execution of the Appcessory application, and exchanges of data and control signals between the accessory device 400 and the digital device 100. The Appcessory client 185 also manages power of the accessory device 400.

If the accessory device 400 is connected to the digital device 100, the Appcessory client 185 searches for an Appcessory application associated with the corresponding accessory device 400 in applications installed in the digital device 100, and causes information about the searched Appcessory application to be displayed.

In order to display information about the Appcessory application, according to an embodiment of the present invention, the Appcessory client 185 may operate as follows. If the accessory device 400 is not connected to the digital device 100, the Appcessory client 185 may cause icons of all Appcessory applications installed in the digital device 100 to be displayed in a deactivated status. Then, if the accessory device 400 is connected to the digital device, the Appcessory client 185 searches for an Appcessory application associated with the accessory device 400, and causes an icon of the searched Appcessory application to be displayed in an activated status. At this time, the icon in the activated status and the icons in the deactivated status may be displayed to be distinguished from icons of other applications that are not Appcessory applications.

The deactivated status is a state in which no accessory device associated with an Appcessory application is connected to the digital device 100. An icon of an Appcessory application that is in a deactivated status may disable a user's ability to select the application corresponding to the deactivated icon. Alternatively, although an icon of an Appcessory application that is in a deactivated status allows a user's selection, the Appcessory application may not be normally executed when it is selected. Also, although an Appcessory application that is in a deactivated status is executed when a user selects an icon of the Appcessory application, a function associated with a control of the corresponding accessory device may be not executed.

The activated status is a state in which an accessory device associated with an Appcessory application is connected to the digital device 100. Accordingly, when an icon of an Appcessory application is in an activated status, a user is able to select the icon of the Appcessory application, and the Appcessory application is executed normally when the user selects the icon of the Appcessory application.

According to another embodiment of the present invention, if the accessory device 400 is connected to the digital device 100, in order to display information about an Appcessory application associated with the accessory device 400, the Appcessory client 185 may operate as follows. If the accessory device 400 is connected to the digital device 100, the Appcessory client 185 may search for an Appcessory application associated with the accessory device 400. Then, the Appcessory client 185 collects update information of the searched Appcessory application and non-installation application information about Appcessory applications associated with the accessory device but not installed in the digital device 100, from the application providing server 200 (see FIG. 2). The Appcessory client 185 also collects status information of the accessory device 400 from the accessory device 400. Then, the Appcessory client 185 may provide the user with information about the searched Appcessory application, the update information of the Appcessory application, the non-installation application information, and the status information of the accessory device. In addition, the Appcessory client 185 may update the existing Appcessory application, download and install a new Appcessory application, or update firmware of the accessory device 400, according to the user's input.

Also, according to an embodiment of the present invention, if an interrupt is generated while an Appcessory application is executed, the Appcessory client 185 ignores the interrupt, provides a part of interrupt information to the user and process the interrupt information, or notifies the user of generation of the interrupt using a predetermined alternative method, according to a predetermined interrupt mode.

In FIG. 6, the Appcessory client 185 is shown to be included in the controller 110, however, according to another embodiment of the present invention, the Appcessory client 185 is provided as a separate module independently from the controller 110. The Appcessory client 185 may be a software module, a hardware module, or a combination of software and hardware.

Figure 7:
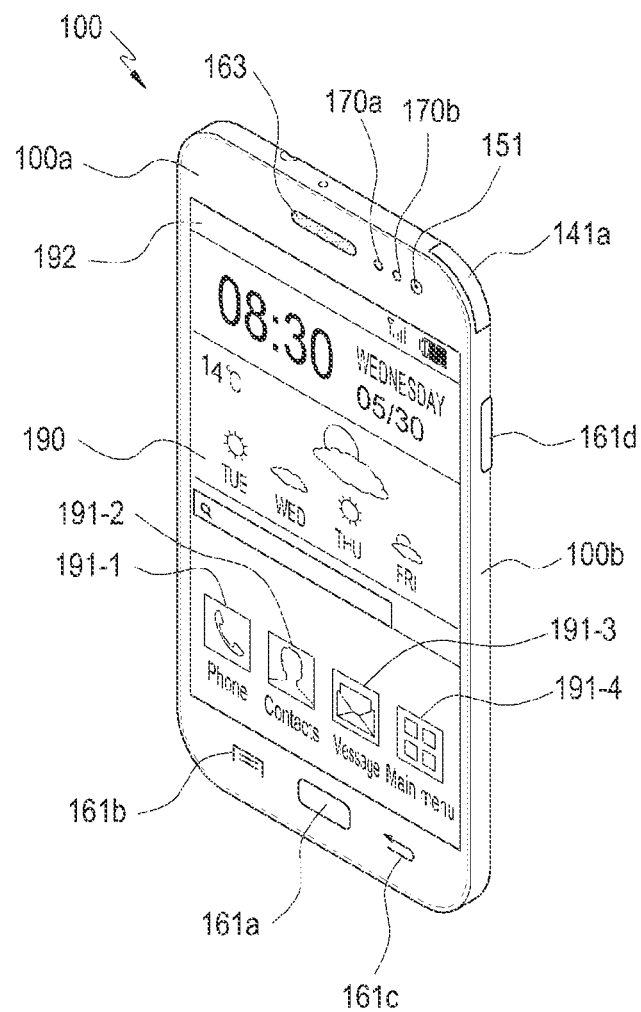
FIG. 7 is a diagram illustrating a perspective view of a front part of a digital device, according to an embodiment of the present invention.
Figure 8:
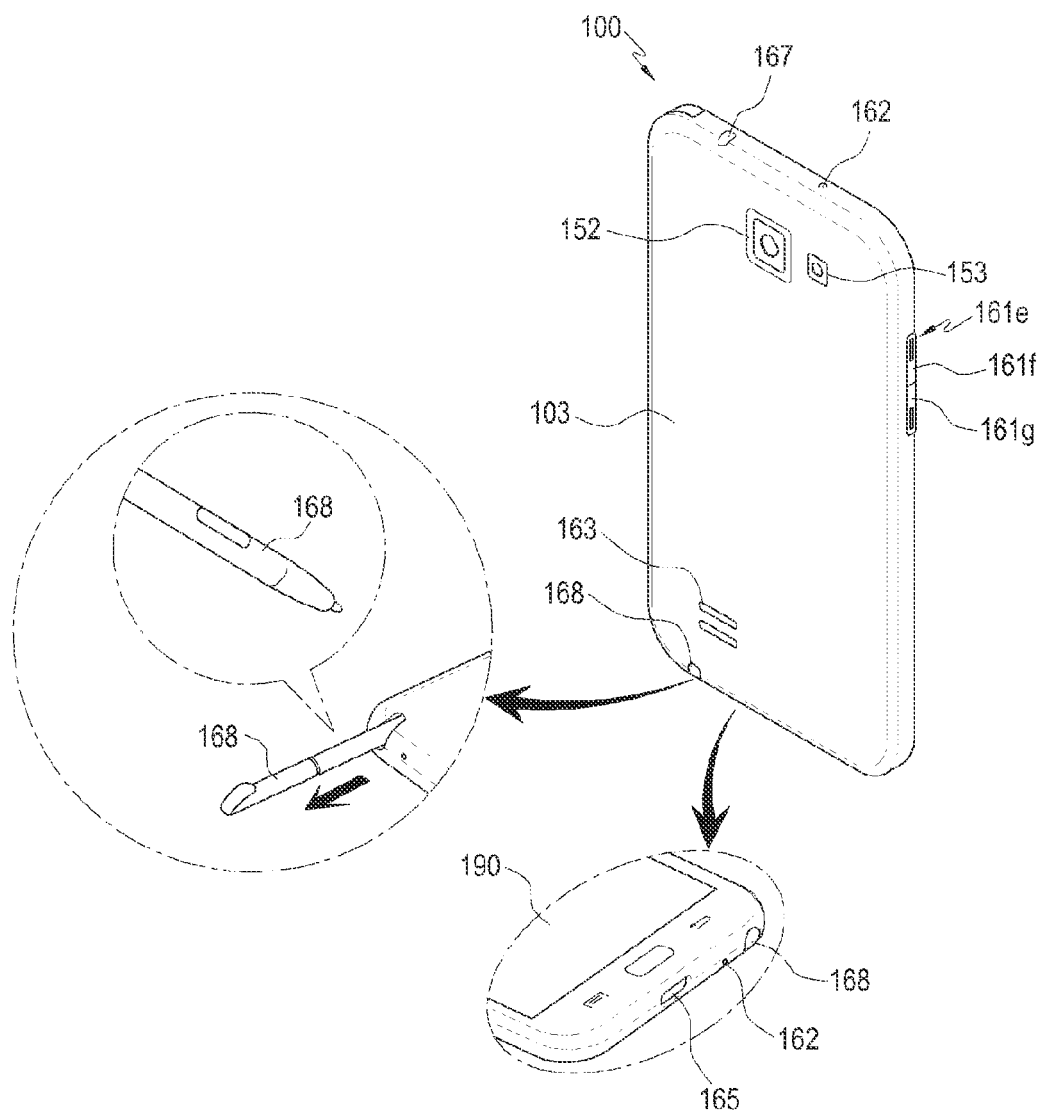
FIG. 8 is a diagram illustrating a perspective view of a rear part of a digital device, according to an embodiment of the present invention.

FIG. 7 is a diagram illustrating a perspective view of a front part of the digital device 100, according to an embodiment of the present invention, and FIG. 8 is diagram illustrating a perspective view of a rear part of the digital device 100, according to an embodiment of the present invention.

Referring to FIGS. 6, 7 and 8, the touch screen 190 is disposed in the front, center part 100*a* of the digital device 100. The touch screen 190 occupies the major area of the front part of the digital device 100. FIG. 7 illustrates an example in which a main home screen is displayed on the touch screen 190. The main home screen is a screen that is first displayed on the touch screen 190 when the digital device 100 powers on. If the digital device 100 has different home screens in the form of several pages, the main home screen may be the first one of the home screens. On the home screen, shortcut icons 191-1 191-2, and 191-3 for executing applications being often executed, a main menu key 191-4, clock, weather, and the like may be displayed. The main menu key 191-4 is used to display a menu screen on the touch screen 190. On the upper area of the touch screen 190, a status bar representing the status of the device 100, such as battery level, intensity of reception signals, and current time, may be displayed.

Below the touch screen 190, a home button 161*a*, a menu button 161*b*, and a back button 161*c* are formed.

The home button 161*a* is used to display the main home screen on the touch screen 190. For example, if the home button 161*a* is pressed when a menu screen or a home screen different from the main home screen is displayed, the main home screen is displayed on the touch screen 190. Also, if the home button 161*a* is touched while applications are executed on the touch screen 190, the main home screen, as illustrated in FIG. 7, is displayed on the touch screen 190. The home button 161*a* is also used to display recently used applications on the touch screen 190 or to display a task manager.

The menu button 161*b* provides connectivity menus that can be used on the touch screen 190. The connectivity menus may include a widget adding menu, a lock screen changing menu, a search menu, an edit menu, and an environment setting menu.

The back button 161*c* is used to request display of a screen displayed just before a current screen or to quit a most recently used application.

The first camera 151, the ambient light sensor 170*a*, and the proximity sensor 170*b* may be disposed in the front part 100*a* of the digital device 100. The second camera 152, a flash 153, and the speaker 163 may be disposed in the back part 100*c* of the digital device 100.

The power/reset button 160*a*, the volume buttons 161*b*, a terrestrial DMB antenna 141*a* for receiving broadcasting, and one or more microphones 162, and the like may be disposed in a side 100*b* of the digital device 100. The terrestrial DMB antenna 141*a* is fixedly or removably attached to the digital device 100.

The connector 165 is formed in the lower side of the digital device 100. The connector 165 includes a plurality of electrodes, and may be connected to an external device in a wired manner. An earphone connecting jack 167 is formed in an upper side of the digital device 100. Earphones are insertable into the earphone connecting jack 167.

Also, in the lower side of the digital device 100, an input device 168 may be formed. The input device 168 may be inserted into and kept in the digital device 100, and drawn out and detached from the digital device 100 when the input device 168 is used.

Hereinafter, a method in which the digital device 100 configured as described above manages Appcessory applications, according to a first embodiment of the present invention, will be described with reference to FIGS. 9 to 10B.

Figure 9:
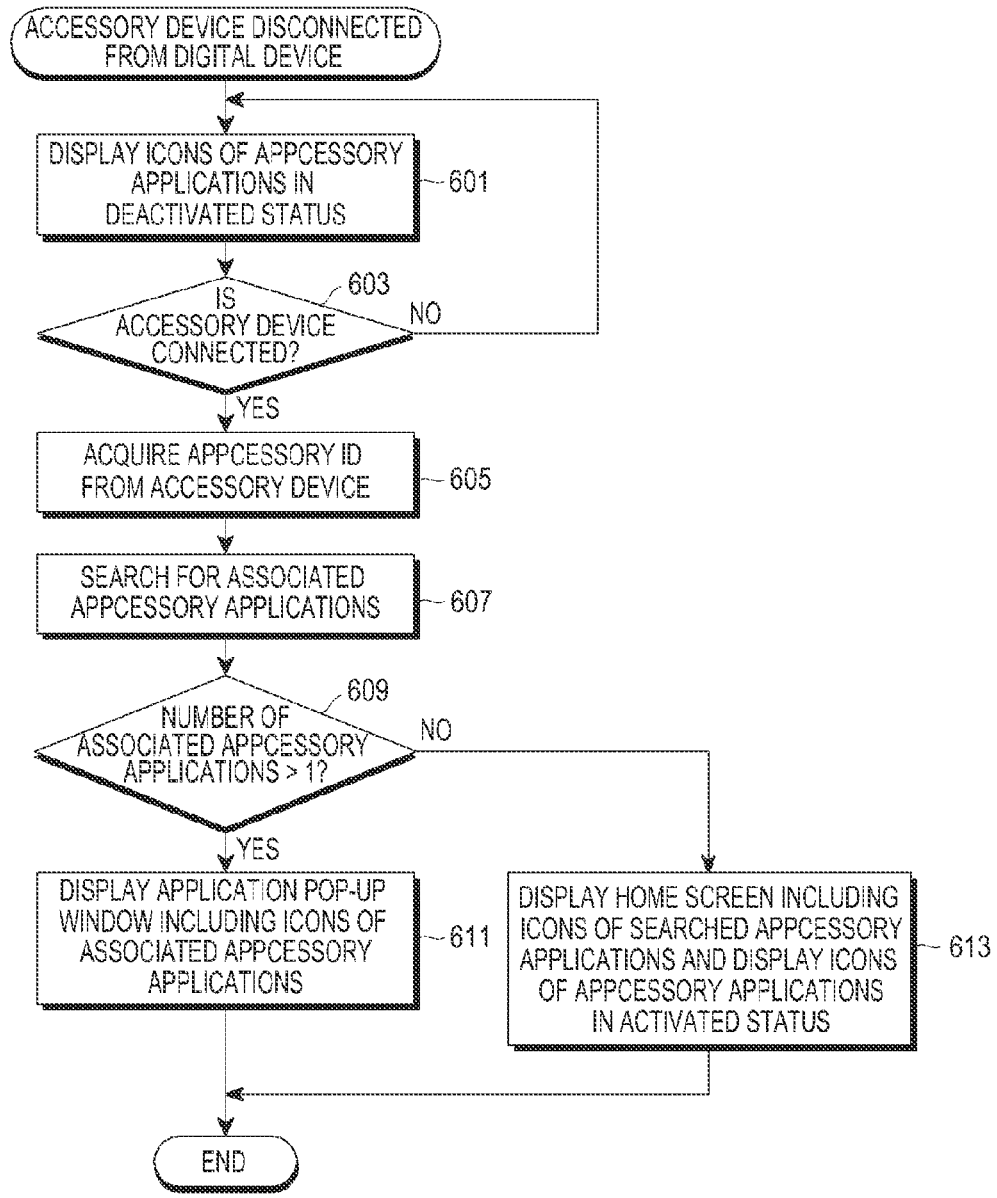
FIG. 9 is a flowchart illustrating an operation method of a digital device, according to an embodiment of the present invention.
Figure 10A:
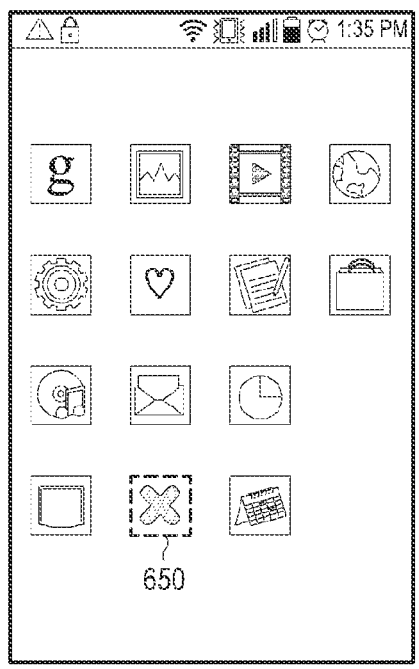
FIGS. 10A and 10B illustrate screens of a digital device, according to an embodiment of the present invention.
Figure 10B:
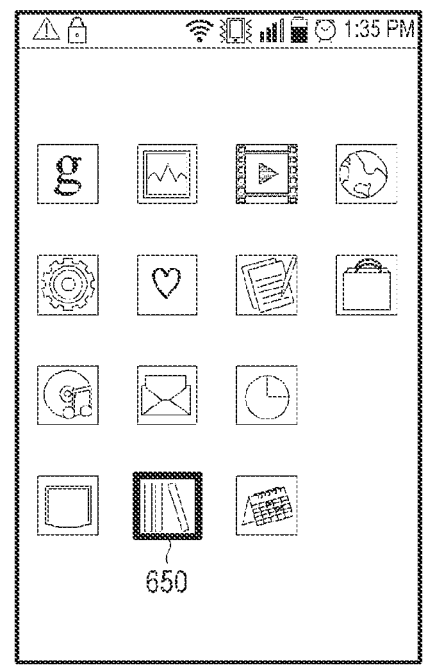

FIG. 9 is a flowchart illustrating an operation method of a digital device according to an embodiment of the present invention, and FIGS. 10A and 10B illustrate screens of a digital device, according to an embodiment of the present invention. The embodiments of FIGS. 9 to 10B address a problem in which a user cannot easily recognize Appcessory applications since icons of the Appcessory applications and general applications are displayed on a home screen without distinction, and also provide, when the accessory device 400 (see FIG. 2) is connected to the digital device 100, a user with information about an Appcessory application associated with the accessory device 400.

The operation method of FIG. 9 starts from a state in which the accessory device 400 is not connected to the digital device 100. The digital device 100 also stores at least one Appcessory application having a function of controlling the accessory device 400. In the following description, steps of FIG. 9 are performed by the controller 110 (see FIG. 6). However, the steps of FIG. 9 may be performed by the Appcessory client 185 (see FIG. 6) in the same manner, in accordance with embodiments of the present invention.

Referring to FIG. 9, since the accessory device 400 is not connected to the display device 100, the controller 110 displays icons of all Appcessory applications stored in the digital device 100 in a deactivated status, in step 601. Here, the icons of the Appcessory applications are displayed in different shapes than the shapes icons of other applications. An example in which an icon of an Appcessory application is displayed in different shapes from icons of general applications is illustrated in FIG. 10A.

FIG. 10A illustrates an example in which a plurality of application icons including an icon 650 of an Appcessory application are displayed on a screen of the digital device 100. The icon 650 of the Appcessory application is displayed in a manner that distinguishes the icon 650 from the remaining icons of the general applications. For example, the icon 650 of the Appcessory application may be displayed as a translucent icon or together with an indicator representing a deactivated status.

Referring again to FIG. 9, the accessory device 400 may be connected to the digital device 100 through a wired cable or short-range communication. For example, the accessory device 400 are connected to the digital device 100 according to at least one communication method of WLAN communication supporting the WLAN standard IEEE802.11x, Bluetooth, and IrDA.

The controller 110 determines whether the accessory device 400 is connected to the digital device 100 (603), and upon a determination that the accessory device 400 is connected to the digital device 100, the controller 110 acquires Appcessory identification information from the accessory device 400, in step 605. In other words, in step 605, the controller 100 requests the accessory device 400 to register Appcessory identification information. Then, the accessory device 400 transmits its own Appcessory identification information to the digital device 100. The Appcessory identification information may include at least one piece of information of device identification information of the accessory device 400 and company identification information of the accessory device 400.

If the controller 110 acquires the Appcessory identification information, the controller 110 searches for an Appcessory application associated with the accessory device 400, in step 607. Accordingly, the controller 110 searches for an Appcessory application including the acquired Appcessory identification information in Appcessory applications stored and installed in the digital device 100.

Then, the controller 110 determines whether at least two Appcessory applications have been searched (i.e., found as a result of the search), in step 609. Upon a determination that two or more Appcessory applications have been searched, the controller 110 proceeds to step 611. In step 611, the controller 100 displays an application pop-up window including icons of the searched Appcessory applications.

Meanwhile, if an Appcessory application is searched in step 609, the controller 110 proceeds to step 613. In step 613, the controller 110 displays a home screen including an icon of the searched Appcessory application. The icon of the Appcessory application included in the home screen is displayed in an activated status. Through this process, the controller 110 recognizes a home screen including the icon of the searched Appcessory application, displays the corresponding home screen on the touch screen 190 of the digital device 100, and displays the icon of the Appcessory application in an activated status in order to represent the fact that the searched Appcessory application is an Appcessory application associated with the accessory device 400 connected to the digital device 100. An example in which an icon of an Appcessory application is displayed in an activated status is illustrated in FIG. 10B. Referring to FIG. 10B, an icon 650 of an Appcessory application is displayed in an activated status. An icon that is in an activated status may be displayed to appear larger than icons of general applications or icons that are in a deactivated status, or together with an indicator representing an activated status.

In steps 611 and 613, icons of Appcessory applications that do not have any function of controlling the accessory device 400 among the plurality of Appcessory applications stored and installed in the digital device 100 are displayed in a deactivated status. If a user selects the icon of an Appcessory application included in the application pop-up window displayed in step 611 or the icon of the Appcessory application displayed in the activated status in step 613, the selected Appcessory application is executed so that the accessory device 400 will be controlled by the digital device 100.

Therefore, by managing Appcessory applications according to an embodiment of the present invention as described above, a user is able to more easily distinguish Appcessory applications from general applications. Also, when an accessory device is connected to a digital device, a user is able to more easily find an Appcessory application associated with the accessory device.

Figure 11:
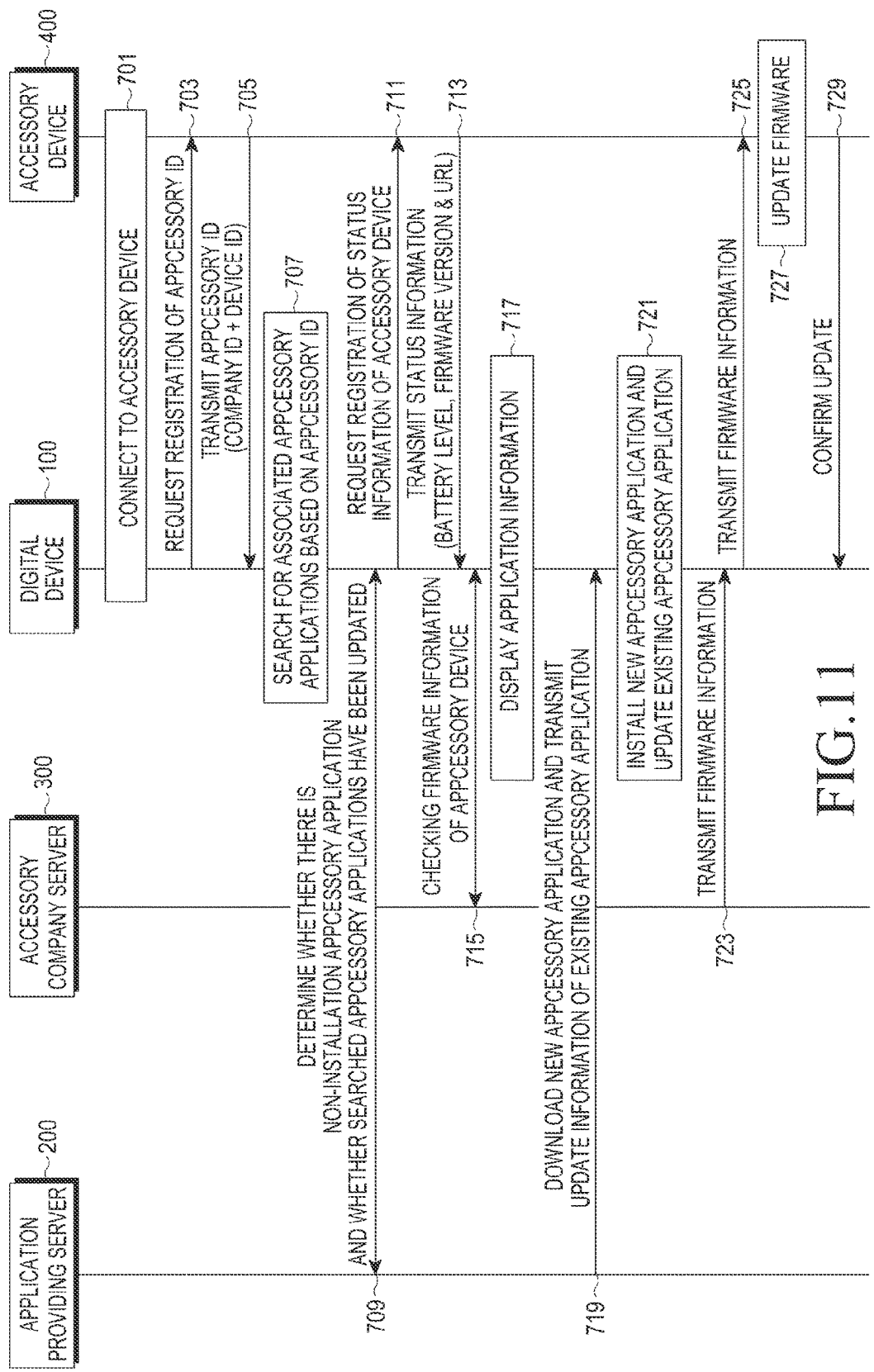
FIG. 11 is a flowchart illustrating an operation method of a service system, according to an embodiment of the present invention.
Figure 12:
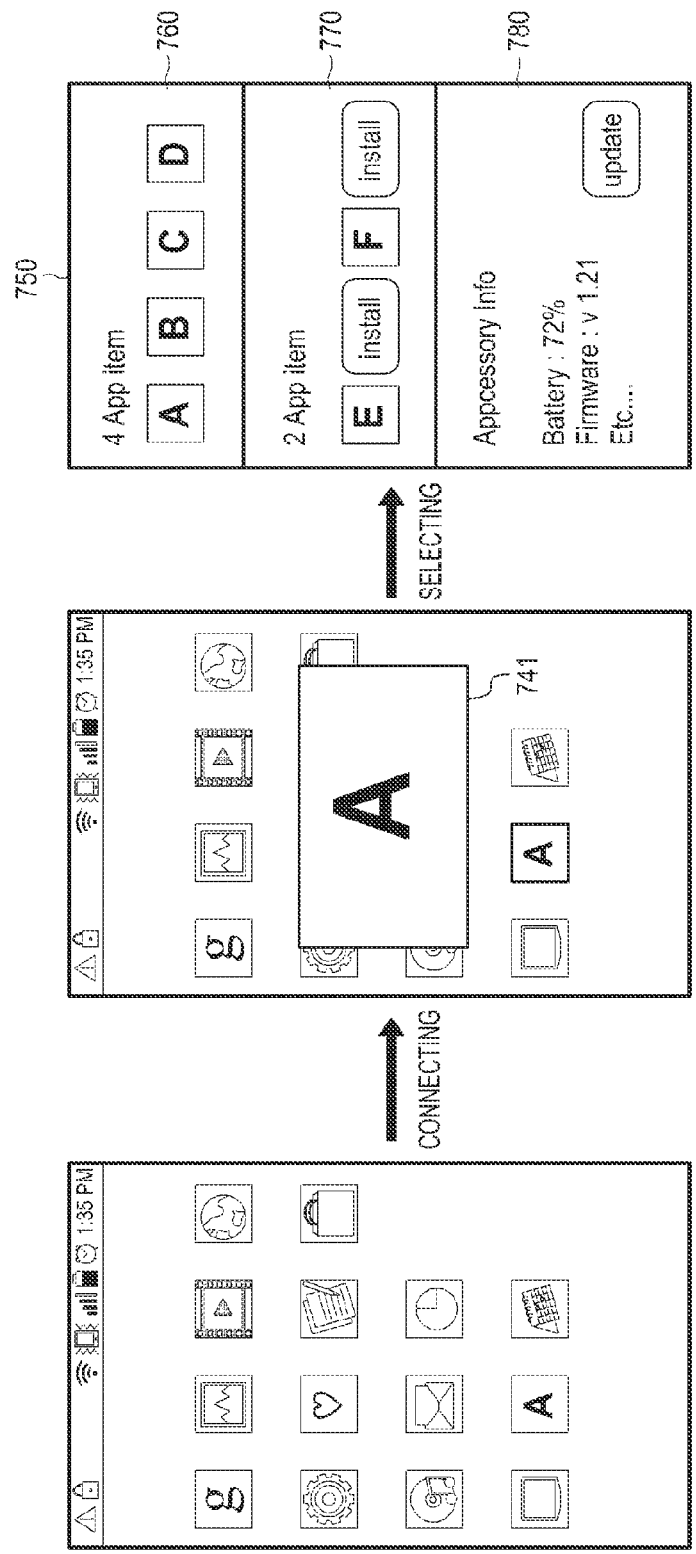
FIGS. 12A, 12B and 12C illustrate screens of a digital device, according to another embodiment of the present invention.

Hereinafter, a method of managing Appcessory applications, according to an embodiment of the present invention, is described with reference to FIGS. 11, 12A, 12B, and 12C. FIG. 11 is a flowchart illustrating an operation method of a service system, according to an embodiment of the present invention, and FIGS. 12A, 12B, and 12C illustrate screens of the digital device 100, according to an embodiment of the present invention. The embodiment of FIGS. 11 to 12C provides detailed information about an Appcessory application associated with the accessory device 400 connected to the digital device 100, and information about the accessory device 400. In the following description, the digital device 100 of FIG. 11 operates under the control of the controller 110 (or the Appcessory client 185) (see FIG. 6). Also, the application providing server 200, the accessory company server 300, and the accessory device 300 operate under the control of the respective controllers 210, 320, and 410 (see FIGS. 2 to 5).

Referring to FIG. 11, the digital device 100 connects to the accessory device 400 according to a request from a user, in step 701. At this time, the digital device 100 displays a connection guide pop-up window for guiding a procedure for connecting to the accessory device 400 under the control of the controller 110. The connection guide pop-up window includes an image or name representing a kind of the accessory device 400. If an error occurs while the digital device 100 connects to the accessory device 400, a message for notifying of the error is displayed in the connection guide pop-up window. The message may include a message for informing of a cause of the error occurrence. For example, when the battery level of the digital device 100 is too low to control the accessory device 400, an error may occur. According to another example, when a procedural error occurs while the digital device 100 connects to the accessory device 400 through short-range communication, the digital device 100 may fail to connect to the accessory device 400. If the digital device 100 successfully connects to the accessory device 400, a message notifying that a connection has been completed is displayed in the connection guide pop-up window.

An example in which a connection guide pop-up window is displayed is illustrated in FIG. 12B. In FIG. 12A, a first screen 730 represents a state in which the accessory device 400 is not connected to the digital device 100. A second screen 740 of FIG. 12B represents a state in which a connection guide pop-up window 741 for guiding a procedure for connecting to the accessory device 400 has been displayed after the procedure for connecting to the accessory device 400 has started.

Referring again to FIG. 11, if the accessory device 400 is connected to the digital device 100, in step 701, the digital device 100 performs a procedure for providing a user with information about an Appcessory application having a function of controlling the accessory device 400. The procedure may automatically start when a connection between the accessory device 400 and the digital device 100 has been completed. Alternatively, the procedure may start when a user touches a connection guide pop-up window 741 after a message notifying that a connection has been completed is displayed in the connection guide pop-up window 741.

Then, the digital device 100 transmits a registration request message for requesting registration of Appcessory identification information to the accessory device 400, in step 703. The accessory device 400, which has received the registration request message, transmits a registration message including its own Appcessory identification information to the digital device 100, in step 705. Here, the Appcessory identification information may include device identification information of the accessory device 400. Also, the Appcessory identification information includes company identification information of the accessory device 400.

The digital device 100, which has received the Appcessory identification information searches for at least one Appcessory application associated with the accessory device 400 from among Appcessory applications stored and installed in the digital device 100, based on the Appcessory identification information, in step 707. More specifically, the controller 110 (see FIG. 6) of the digital device 100 searches for at least one Appcessory application including the acquired Appcessory identification information from among the Appcessory applications stored and installed in the digital device 100.

Then, the controller 110 of the digital device 100 transmits an application confirmation request message to the application-providing server 200 in order to acquire additional information about the Appcessory applications including the function of controlling the Accessory device 400, in step 709. Accordingly, the controller 110 of the digital device 100 requests a determination of whether the Appcessory applications searched in step 707 have been updated in the application confirmation request message. Accordingly, the application confirmation request message may include identification information of the searched Appcessory applications. Also, the controller 110 of the digital device 100 may include a confirmation request for a determination of whether there is an Appcessory application having a function for controlling the accessory device 400, but that is not installed in the digital device 100, in the application confirmation request message. Accordingly, the application confirmation request message includes the Appcessory identification information acquired in step 705.

The application-providing server 200, upon receiving the application confirmation request message, determines whether the corresponding applications have been updated based on the Appcessory identification information included in the Application confirmation request message. Then, the application-providing server 200 collects information about Appcessory applications not installed in the digital device 100, based on the Appcessory identification information and Appcessory application identification information included in the application confirmation request message. Then, the application-providing server 200 transmits an application response message including information about whether the applications have been updated and information about non-installation Appcessory applications, to the digital device 100, in step 709.

Then, the digital device 100 transmits a message for requesting the accessory device 400 to register status information, to the accessory device 400, in step 711. The accessory device 400, which has received the message, transmits status information of the accessory device 400 to the digital device 100. The status information, which is information representing the status of the accessory device 400, may include, for example, a battery level of the accessory device 400, firmware version information, and address information for downloading the firmware information The digital device 100, which has received the status information, collects the firmware information of the accessory device 400, in step 715. More specifically, the digital device 100 transmits a firmware confirmation request message for checking the latest firmware version of the accessory device 400 to the accessory company server 300, based on the address information included in the status information. Accordingly, the firmware confirmation request message may include Appcessory identification information. The accessory company server 300, which has received the firmware confirmation request message, checks the version of firmware associated with the corresponding accessory device 400, based on the Appcessory identification information included in the firmware confirmation request message. Then, the accessory company server 300 transmits a firmware response message including firmware version information to the digital device 100.

Then, in step 717, the controller 110 of the digital device 100 displays an application information pop-up window in order to provide the user with information collected in steps 707, 709, 713, and 715. The application information pop-up window includes information about the Appcessory applications searched in step 707. The application information pop-up window further includes information collected in step 709, i.e., information about whether the searched Appcessory applications have been updated and information about non-installation Appcessory applications. The application information pop-up window also includes status information of the accessory device 400, received in step 713 and information about latest firmware version, received in step 715. An example of the application information pop-up window 750 is illustrated in FIG. 12C.

In FIG. 12C, a third screen 750 illustrates an application information pop-up window 750. A first area 760 of the application information pop-up window 750 displays information about existing applications. More specifically, the first area 760 displays icons of Appcessory applications associated with the accessory device 400 and stored and installed in the digital device 100. Upon determining that there is an Appcessory application that should be updated, based on information received in step 709, the Appcessory application is displayed together with a update indicator representing that the corresponding Appcessory application should be updated. The first area 760 of FIG. 12C displays four Appcessory applications A, B, C, and D, and icons of the Appcessory applications C and D are displayed together with update indicators.

A second area 770 displays information about new applications. More specifically, the second area 770 displays icons of Appcessory applications (i.e., non-installation Appcessory applications) including a function of controlling the accessory device 400 but not installed in the digital device 100. In the second area 770, install icons for allowing a user to download the non-installation Appcessory applications may further be displayed next to the corresponding Appcessory applications. The second area 770 of FIG. 12C displays Appcessory applications E and F.

A third area 770 displays information about the accessory device 400. The third area 770 displays status information received from the accessory device 400, and further displays information about latest firmware version of the accessory device 400, received from the accessory company server 300. Also, an update icon for allowing a user to download the latest firmware is displayed together with the information about the latest firmware version.

As such, by displaying an application information pop-up window 750, a user can check information about already installed applications, information about installable applications, and status information of the accessory device 400. Also, the user may request updating of an existing Appcessory application, downloading of a new Appcessory application, and updating of the firmware of the accessory device 400 as necessary. Alternatively, the user may request execution of a specific Appcessory application. Steps 719 to 729 of FIG. 11 may be performed according to a request from a user.

Referring again to FIG. 11, if the user issues a request for updating an Appcessory application to be updated from among the Appcessory applications searched in step 707, the digital device 100 receives update information of the corresponding Appcessory application from the application-providing server 200, in step 719. Meanwhile, if the user issues a request for downloading a new Appcessory application, the digital device 100 downloads the corresponding Appcessory application from the application-providing server 200.

In other words, the controller 110 of the digital device 100 transmits, to the application-providing server 200, an update request message for requesting the application-providing server 200 to send update information of a specific Appcessory application, according to a request from a user. Here, the update request message includes identification information of the specific Appcessory application. Accordingly, the application-providing server 200 transmits update information of the specific Appcessory application to the digital device 100. The controller 100 of the digital device 100, which has received the update information of the specific application, updates the specific Appcessory application using the received update information.

The controller 110 of the digital device 100 also transmit a download request message for requesting the application providing server 200 to send a new Appcessory application, to the application providing server 200, according to a request from the user. Accordingly, the application-providing server 200 transmits the new Appcessory application to the digital device 100. The controller 110 of the digital device 100, which has received the new Appcessory application, stores and installs the new Appcessory application.

If the digital device 100 receives a request for updating firmware of the accessory device 400 from the user, the digital device 100 acquires firmware information of the accessory device 400, in step 713. More specifically, the controller 110 of the digital device 100 transmits a firmware update message to the accessory company server 300 according to a request from the user. The accessory company server 300, which has received the firmware update message, transmits the corresponding firmware information to the digital device 100.

The digital device 100, which has received the firmware information, transmits the firmware information to the accessory device 400, in step 725. The accessory device 400, which has received the firmware information, updates firmware based on the received firmware information and provides an update confirmation message to the digital device 100.

As described above, according to an embodiment of the present invention, all information about an Appcessory application associated with the accessory device 400 connected to the digital device 100 is provided to a user. Accordingly, the user is able to intuitively recognize information about an Appcessory application associated with the accessory device 400. By allowing a user to easily update or install an associated Appcessory application, the user is able to conveniently manage Appcessory applications.

FIGS. 11, 2A, 12B, and 12C correspond to an example in which the digital device 100 collects all information about already installed Appcessory applications, update information of Appcessory applications searched by the application providing server 200, information about non-installation Appcessory applications, and status information of the accessory device 400, and provides the collected information to a user.

However, according to another embodiment of the present invention, the digital device 100 collects at least one piece of information of information about already installed Appcessory applications, update information of Appcessory applications searched by the application providing server 1200, information about non-installation Appcessory applications, and status information of the accessory device 400, and provides the collected information to a user.

Then, according to yet another embodiment of the present invention, a method of managing Appcessory applications when an interrupt is generated due to an event generated in the digital device 100, while an Appcessory application is being executed, is described as follows with reference to FIG. 13. In the following description, the operation of the digital device 400 may be performed by the controller 110 of the digital device 100 or under the control of the Appcessory client 185 (see FIG. 6).

Since the digital device 100 is not a dedicated controller for the accessory device 400, various kinds of events may be generated while an Appcessory application is executed to control the accessory device 400. Among such various kinds of events, there may be an event causing an interrupt process that interferes with execution of an Appcessory application.

The interrupt process that interferes with execution of the Appcessory application may be a process of switching the screen of the digital device 100 from an execution screen of the Appcessory application to an event-related screen, or a process of overlapping information on the execution screen of the Appcessory application, in order to notify of generation of an event or process a generated event. Alternatively, the interrupt process that interferes with execution of the Appcessory application may be a process of interrupting execution of the Appcessory application in order to notify of generation of an event or process a generated event. As such, an event causing an interrupt process that interferes with execution of an Appcessory application is referred to as an interrupt event (hereinafter, simply referred to as an interrupt). In detail, the interrupt process may be notification according to a call incoming event, an SMS incoming event, an MMS incoming event, and an Instant Messaging (IM) incoming event. According to another example, the interrupt process may be notification according to push events of various kinds of applications stored in the digital device 100. According to yet another example, the interrupt process may be notification according to a warning event of informing that the battery level of the digital device 10 is lower than a reference level.

In order to manage an interrupt of interfering with execution of an Appcessory application, three interrupt management modes are proposed. The first mode is an all interrupt-disallowing mode, the second mode is a partial interrupt-allowing mode, and the third mode is an alternative notification mode. An interrupt management mode is set in the digital device 100 while an Appcessory application is executed, and an interrupt management mode to be set may be designated by a user.

The all interrupt-disallowing mode is allocated to an Appcessory application performing a process with priority among all processes that can be performed in the digital device 100, and in the all interrupt-disallowing mode, all interrupts generated in the digital device 100 are ignored. When an interrupt is generated in the all interrupt-disallowing mode, all interrupt processes that interrupt an Appcessory application being executed are disallowed. For example, no notification for informing of generation of an interrupt, processing of the interrupt, and the results of the processing is generated. A history of interrupts generated in the all interrupt-disallowing mode may be stored in a notification notepad.

In the partial interrupt-allowing mode, a subset of interrupts is allowed to be processed. That is, interrupts for at least one Appcessory application among a plurality of Appcessory applications stored and installed in the digital device 100 is allowed, and interrupts for the remaining Appcessory applications are disallowed. In other words, if an Appcessory application being executed is an application allowing interrupts, when an interrupt is generated in the partial interrupt-allowing mode, the execution of the Appcessory application is temporarily interrupted and the generated interrupt is processed. Interrupt-allowing applications and interrupt-disallowing applications among a plurality of Appcessory applications stored and installed in the digital device 100 may be selected by a user. In addition, allowed interrupts that can be processed and disallowed interrupts that cannot be processed, among interrupts, may also be selected by the user. More specifically, in the partial interrupt-allowing mode, if an allowed interrupt is generated when an interrupt-allowing application is executed, the generated interrupt may be processed.

According to one example, a remote control application for controlling a remote control airplane has been designated as an interrupt-disallowing application, an image output application for controlling a monitor has been designated as an interrupt-allowing application, an incoming call has been designated as an allowed interrupt, and an incoming message has been designated as a disallowed interrupt. In this case, if the remote control application is being executed, all interrupt processes caused by either an incoming call event or an incoming message event are disallowed so that no notification associated with generation of such an event is provided to a user. However, event generation information may be stored in the notification notepad.

If an incoming call is received while an image output application is being executed, an incoming call screen is displayed, and the image output application is temporarily quitted. Then, a user determines whether to answer the incoming call. If the user answers the incoming call, the image output application restarts after the call is finished. However, all interrupt processes according to a message incoming event are disallowed while the image output application is being executed.

The alternative notification mode is a mode for notifying of generation of an interrupt while an Appcessory application is executed by a predetermined alternative method. The predetermined alternative method may include, for example, activating a Light-Emitting Diode (LED) installed in the digital device 100, generation of warning sound, or generation of vibration. The predetermined alternative method may vary depending on the kind of an interrupt. For example, generation of vibration may be designated as an alternative method corresponding to an incoming call, and irradiation of a LED may be designated as an alternative method corresponding to an incoming message.

The digital device 100 provides a user interface for setting an interrupt management mode in order to enable a user to set a mode of the all interrupt-disallowing mode, the partial interrupt-allowing mode, and the alternative notification mode. When the user selects the partial interrupt-allowing mode, the digital device 100 provides the user with a list of all Appcessory applications stored and installed in the digital device 100 to enable the user to designate interrupt-allowing Appcessory applications and interrupt-disallowing Appcessory applications. The digital device 100 also provides the user with a list of interrupts to enable the user to designate allowed interrupts and disallowed interrupts. According to an embodiment of the present invention, the digital device 100 provides a user interface for enabling a user to designate a new Appcessory application as an interrupt-allowing application or an interrupt-disallowing application when the new Appcessory application is installed.

If the alternative notification mode is selected, the digital device 100 may provide the user with the list of interrupts so that the user can designate an alternative notification method for each interrupt.

If the same interrupt is generated at least twice in a predetermined time period, although one of the three interrupt management modes is set, the digital device 100 informs the user of a kind of the interrupt through a translucent pop-up window, as an exception. For example, if a call sent from the same sender is received twice in a predetermined time period, the display device 100 ignores the first call, but displays call incoming information through a translucent pop-up window when the second call is received.

Figure 13:
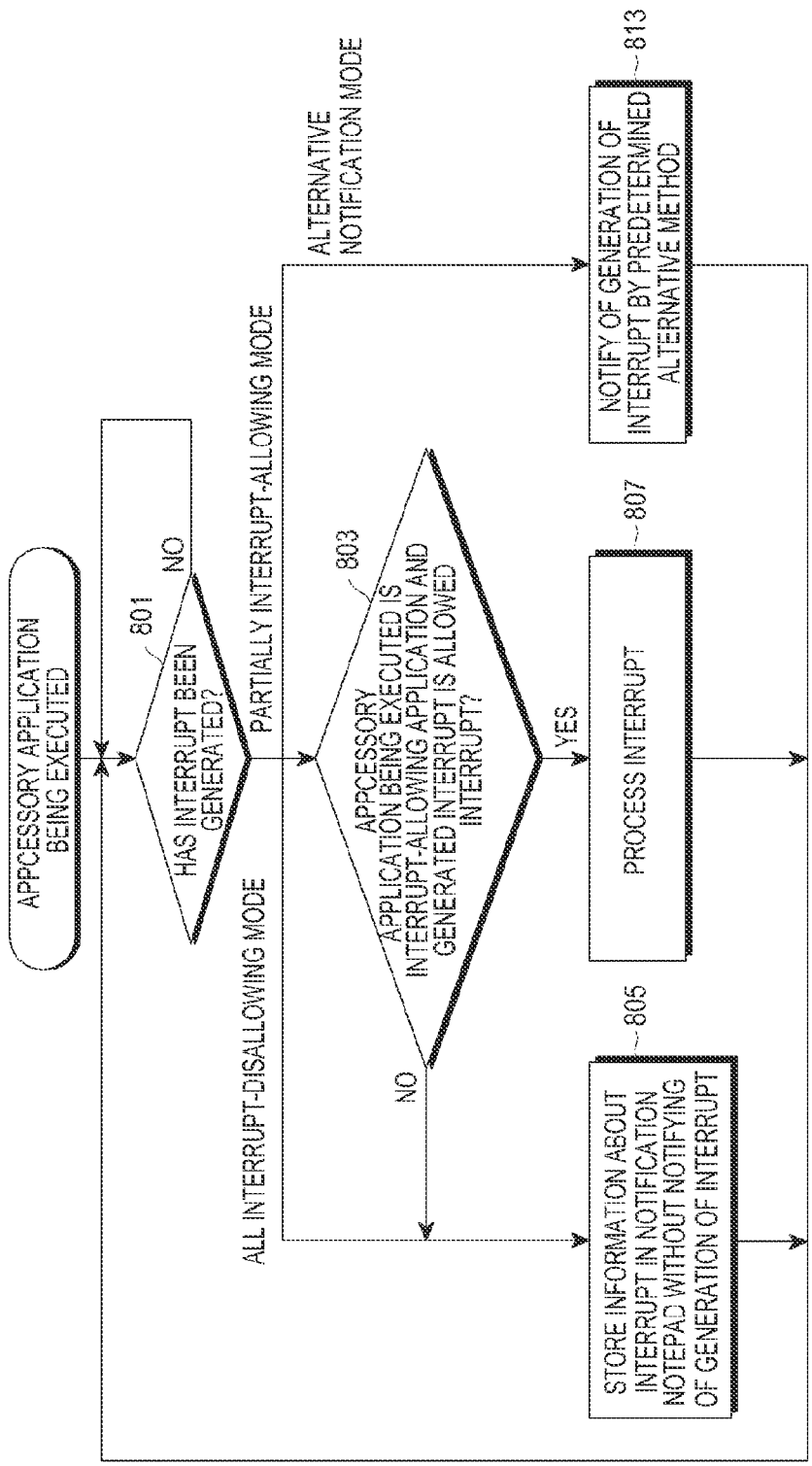
FIG. 13 is a flowchart illustrating an operation method of a digital device, according to another embodiment of the present invention.

FIG. 13 is a flowchart illustrating a process in which a digital device of FIG. 6 processes an interrupt while an Appcessory application is executed, according to an embodiment of the present invention. The embodiment illustrated in FIG. 13 does not illustrate the above-described exception. Referring to FIG. 13, the controller 110 (see FIG. 6) of the digital device 100 sets an interrupt management mode designated in advance by a user, when an Appcessory application starts execution. Then, the controller 110 determines whether an interrupt has been generated, in step 801. Upon determining that an interrupt has been generated, the digital device 100 proceeds to step 805, if an interrupt management mode set in the digital device 100 is an all interrupt-disallowing mode. In step 805, the controller 110 stores information about the interrupt in a notification notepad without processing the interrupt. More specifically, the controller 110 stores information about the interrupt in a notification notepad without notifying of generation of the interrupt, and then returns to step 801. The notification notepad stores a history of interrupts. For example, the notification notepad stores the kinds of generated interrupts, times at which the interrupts have been generated, and how many times the interrupts have been generated. Also, the notification notepad may be checked by a user at any time after the execution of the Appcessory application has terminated.

Meanwhile, if an interrupt management mode set in the digital device 100 is a partial interrupt-allowing mode, the controller 110 proceeds to step 803. In step 803, the controller 110 determines whether the Appcessory application being executed is an interrupt-allowing application and whether the generated interrupt is an allowed interrupt. Upon determining that the Appcessory application being executed is not an interrupt-allowing application or that the generated interrupt is not an allowed interrupt, the controller 100 proceeds to step 805. However, if the Appcessory application currently being executed is an interrupt-allowing application and the generated interrupt is an allowed interrupt, the controller 110 proceeds to step 807.

In step 807, the controller 110 processes the interrupt, and proceeds to step 801. More specifically, the controller 100 displays a pop-up window for notifying a user of the generation of the interrupt. If processing of the interrupt is completed by displaying a notification pop-up window according to the kind of the interrupt, the controller 100 proceeds to step 801.

If an interrupt that requires a feedback from a user, such as an incoming call, has been generated, the controller 110 waits for the user's request for processing or ignoring the interrupt. If a request for processing the interrupt is received from the user, the controller 110 temporarily stops execution of the Appcessory application, and processes the interrupt. Then, if the interrupt has been completely processed, the controller 100 restarts execution of the Appcessory application, and proceeds to step 801. If a request for ignoring the interrupt is received from the user, the controller 110 stops processing the interrupt, and proceeds to step 801.

Meanwhile, if the interrupt management mode set in the digital device 100 is an alternative notification mode, the controller 110 proceeds to step 809. In step 809, the controller 100 notifies of generation of the interrupt by a predetermined alternative method, and then proceeds to step 801.

As described above, according to the third embodiment of the present invention, by properly processing an interrupt generated when an Appcessory application is being executed in the digital device 100, the Appcessory application may be stably executed.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for managing an external device in a mobile device that includes a controller, the method comprising:
   receiving an input for executing an application for controlling, by the controller, the external device;
   deactivating a set of functions provided by the application if the external device doesn't connect to the mobile device, the set of functions being used to control the external device;
   activating the set of functions provided by the application and receiving state information of the external device if the external device connects to the mobile device;
   displaying at least one installed application icon corresponding to at least one application having a set of functions being used to control the external device from among at least one application installed in the mobile device;
   displaying at least one non-installed application icon corresponding to at least one application non-installed in the mobile device; and
   displaying information about a latest firmware version of the external device by acquiring information about the latest firmware version from an external company server using the state information.

2. The method of claim 1, further comprising:
   receiving application identification information from the external device if the external device is connected to the mobile device;
   searching, based on the application identification information, for the at least one application having the set of functions being used to control the external device from among the at least one application installed in the mobile device; and
   displaying application information associated with the at least one searched application according to a result of the search.

3. The method of claim 2, wherein the application identification information includes at least one of device identification information of the external device and company identification information of the external device.

4. The method of claim 2, wherein displaying at least one installed application icon corresponding to at least one application having a set of functions being used to control the external device from among at least one application installed in the mobile device comprises:
   displaying, if an application having the set of functions being used to control the external device is searched in the applications installed in the mobile device, an installed application icon of the searched application having the set of functions being used to control external the device, wherein the installed application icon is represented in an activated status; and
   displaying, if a plurality of applications having the set of functions being used to control the external device are searched in the applications installed in the mobile device, an application pop-up window including a plurality of installed application icons of the respective searched applications having the set of functions being used to control external device.

5. The method of claim 4, wherein at least one installed application icon having the set of functions being used to control the external device is represented in a deactivated status and displayed before the external device is connected to the mobile device.

6. The method of claim 5,
   wherein the state information of the external device includes a battery level of the external device and firmware version information of the external device.

7. The method of claim 6, further comprising downloading the at least one non-installed application from the application providing server and installing the at least one non-installed application if a request for downloading the at least one non-installed application is received.

8. The method of claim 6, further comprising downloading, if a request for updating the searched applications is received, update information about the searched applications from the application providing server and updating the searched applications.

9. The method of claim 6, further comprising:
   downloading, if a request for downloading the latest firmware version is received, the latest firmware version from the external company server; and
   transmitting information about the downloaded latest firmware version to the external device.

10. The method of claim 2, wherein searching the at least one application further comprises:
    acquiring information about at least one non-installed application having the set of functions being used to control the external device from an application providing server, and
    wherein the application information including the information about the at least one non-installed application is displayed.

11. The method of claim 10, wherein searching the at least one application further comprises acquiring information about whether the searched applications have been updated from the application providing server, and wherein the application information including the information about whether the searched applications have been updated is displayed.

12. The method of claim 2, further comprising:
executing the searched applications;
detecting generation of an interrupt interfering with the execution of the searched applications; and
ignoring, if an all interrupt-disallowing mode has been set, the interrupt.

13. The method of claim 12, further comprising:
determining, if a partial interrupt-allowing mode has been set, whether the searched applications are interrupt-allowing applications and whether the interrupt is an allowed interrupt;
processing, if the searched applications are interrupt-allowing applications and if the interrupt is an allowed interrupt, the interrupt; and
ignoring, if the searched applications are interrupt-disallowing applications or if the interrupt is a disallowed interrupt, the interrupt.

14. The method of claim 13, further comprising outputting, if an alternative notification mode has been set, a notification of generation of the interrupt by a predetermined alternative method.

15. An external device management apparatus for a mobile device, comprising:
a display displaying various data under a control of a controller; and
the controller configured to
receive an input for executing an application for controlling an external device,
deactivate a set of functions provided by the application if the external device doesn't connect to the mobile device, the set of functions being used to control the external device,
activate the set of functions provided by the application and receive state information of the external device if the external device connects to the mobile device,
display at least one installed application icon corresponding to at least one application having a function of controlling the external device,
display at least one non-installed application icon corresponding to at least one non-installed application, and
display information about a latest firmware version of the external device by acquiring information about the latest firmware version from an external company server using the state information.

16. The external device management apparatus of claim 15,
wherein the controller is further configured to:
acquire application identification information from the external device if the external device is connected to the mobile device, search for, based on the application identification information, the at least one application having the set of functions being used to control the external device from among the at least one application installed in the mobile device, and cause application information associated with the at least one searched application to be displayed on the display according to a result of the search.

17. The external device management apparatus of claim 16, wherein the application identification information includes at least of device identification information of the external device and company identification information of the external device.

18. The external device management apparatus of claim 16, wherein if an application having the set of functions being used to control the external device is searched in the applications installed in the mobile device, the controller controls the display to display an installed application icon of the searched application having the set of functions being used to control the external device, the installed application icon represented in an activated status, and if a plurality of applications having the set of functions being used to control the external device are searched in the applications installed in the mobile device, the controller controls the display to display an application pop-up window including a plurality of installed application icons of the respective searched applications having the set of functions being used to control the external device.

19. The external device management apparatus of claim 18, wherein at least one installed application icon of the searched applications having the set of functions being used to control the external device is represented in a deactivated status and displayed if the external device is disconnected from the mobile device.

20. The external device management apparatus of claim 16, wherein the controller is configured to acquire information about at least one non-installed application having the function of controlling the external device from an application providing server, and wherein the application information including the information about the at least one non-installed application is displayed.

21. The external device management apparatus of claim 20, wherein the controller is configured to acquire information about whether the searched applications have been updated from the application providing server, and wherein the application information including the information about whether the searched applications have been updated is displayed.

22. The external device management apparatus of claim 21,
wherein the state information of the external device includes a battery level of the external device and firmware version information of the external device.

23. The external device management apparatus of claim 22, wherein the controller is configured to download, if a request for downloading the at least one non-installed application is received, the at least one non-installed application from the application providing server and installs the at least one non-installed application.

24. The external device management apparatus of claim 22, wherein the controller is configured to download, if a request for updating the searched applications is received, update information about the searched applications from the application providing server and update the searched applications.

25. The external device management apparatus of claim 22, wherein the controller is configured to download, if a request for downloading the latest firmware version is received, the latest firmware version from the external company server, and transmits information about the downloaded latest firmware version to the external device.

26. The external device management apparatus of claim 16, wherein the controller is configured to execute the searched applications, detect generation of an interrupt interfering with the execution of the searched applications, and ignore, if an all interrupt-disallowing mode has been set, the interrupt.

27. The external device management apparatus of claim 26, wherein the controller is configured to determine, if an partial interrupt-allowing mode has been set, whether the searched applications are interrupt-allowing applications and whether the interrupt is an allowed interrupt, process, if the searched applications are interrupt-allowing applications and the interrupt is an allowed interrupt, the interrupt, and ignore, if the searched applications are interrupt-disallowing applications or if the interrupt is a disallowed interrupt, the interrupt.

28. The external device management apparatus of claim 27, wherein the controller is configured to output a notification of generation of the interrupt by a predetermined alternative method if an alternative notification mode has been set.

\* \* \* \* \*